United States Patent
Davis, III et al.

(10) Patent No.: US 7,401,149 B2
(45) Date of Patent: Jul. 15, 2008

(54) METHOD FOR AUTOMATICALLY PROVIDING A TEMPORARY USER ACCOUNT FOR SERVICING SYSTEM RESOURCES

(75) Inventors: Charles Kenneth Davis, III, Mechanicsburg, PA (US); Kevin Thomas McClain, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1266 days.

(21) Appl. No.: 10/081,552

(22) Filed: Feb. 22, 2002

(65) Prior Publication Data

US 2003/0163338 A1 Aug. 28, 2003

(51) Int. Cl.
*G06F 15/173* (2006.01)
(52) U.S. Cl. ...................................... 709/229; 709/224
(58) Field of Classification Search ......... 709/223–229, 709/201–207; 726/3–4, 16–17, 21; 379/9, 379/15
See application file for complete search history.

(56) References Cited

U.S. PATENT DOCUMENTS

| | | | | |
|---|---|---|---|---|
| 5,970,149 A | * | 10/1999 | Johnson .................... | 714/46 |
| 6,026,500 A | * | 2/2000 | Topff et al. ................ | 714/26 |
| 6,701,345 B1 | * | 3/2004 | Carley et al. ............... | 709/205 |
| 6,988,208 B2 | * | 1/2006 | Hrabik et al. .............. | 726/23 |
| 7,020,697 B1 | * | 3/2006 | Goodman et al. .......... | 709/223 |
| 2004/0210662 A1 | * | 10/2004 | Lim et al. .................. | 709/229 |

* cited by examiner

*Primary Examiner*—Andrew Caldwell
*Assistant Examiner*—John Frink
(74) *Attorney, Agent, or Firm*—Schmeiser, Olsen & Watts; David R. Irvin

(57) ABSTRACT

Temporary access is provided to enable a service provider to service a customer's system resource such as data processing or communication equipment. A prearranged but dormant user account for the service provider is automatically activated in response to a trigger event such as the opening of a trouble ticket. The account is automatically deactivated upon detecting a closure event associated with the trigger event, such as the closing of the trouble ticket, expiration of a predetermined time interval following detection of the trigger event, or occurrence of a predetermined time. This provides a timely yet secure way for a customer to allow a service provider access to system resources which requires neither a standing open account nor manual opening and closing of a user account for the service provider.

15 Claims, 4 Drawing Sheets

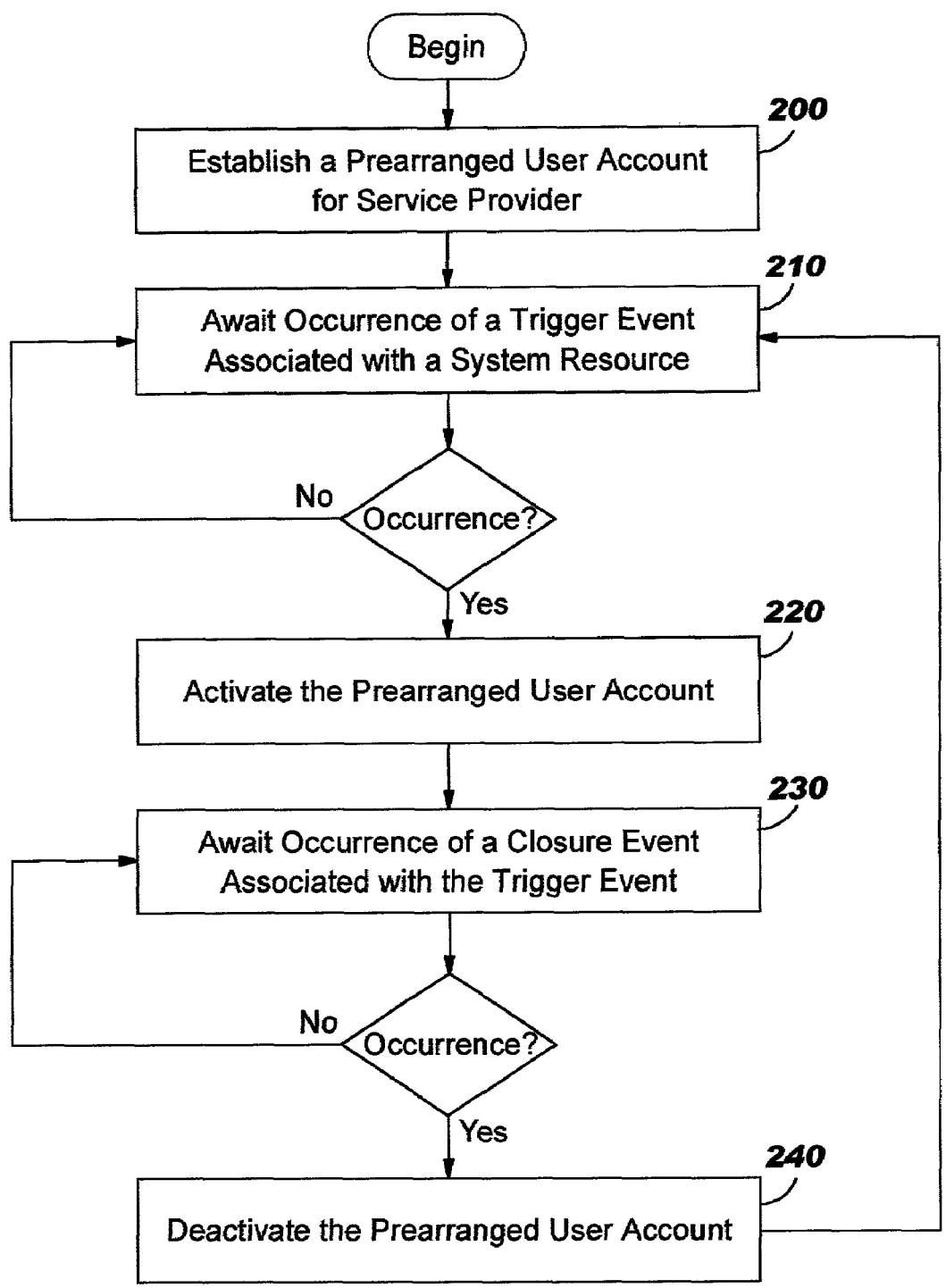

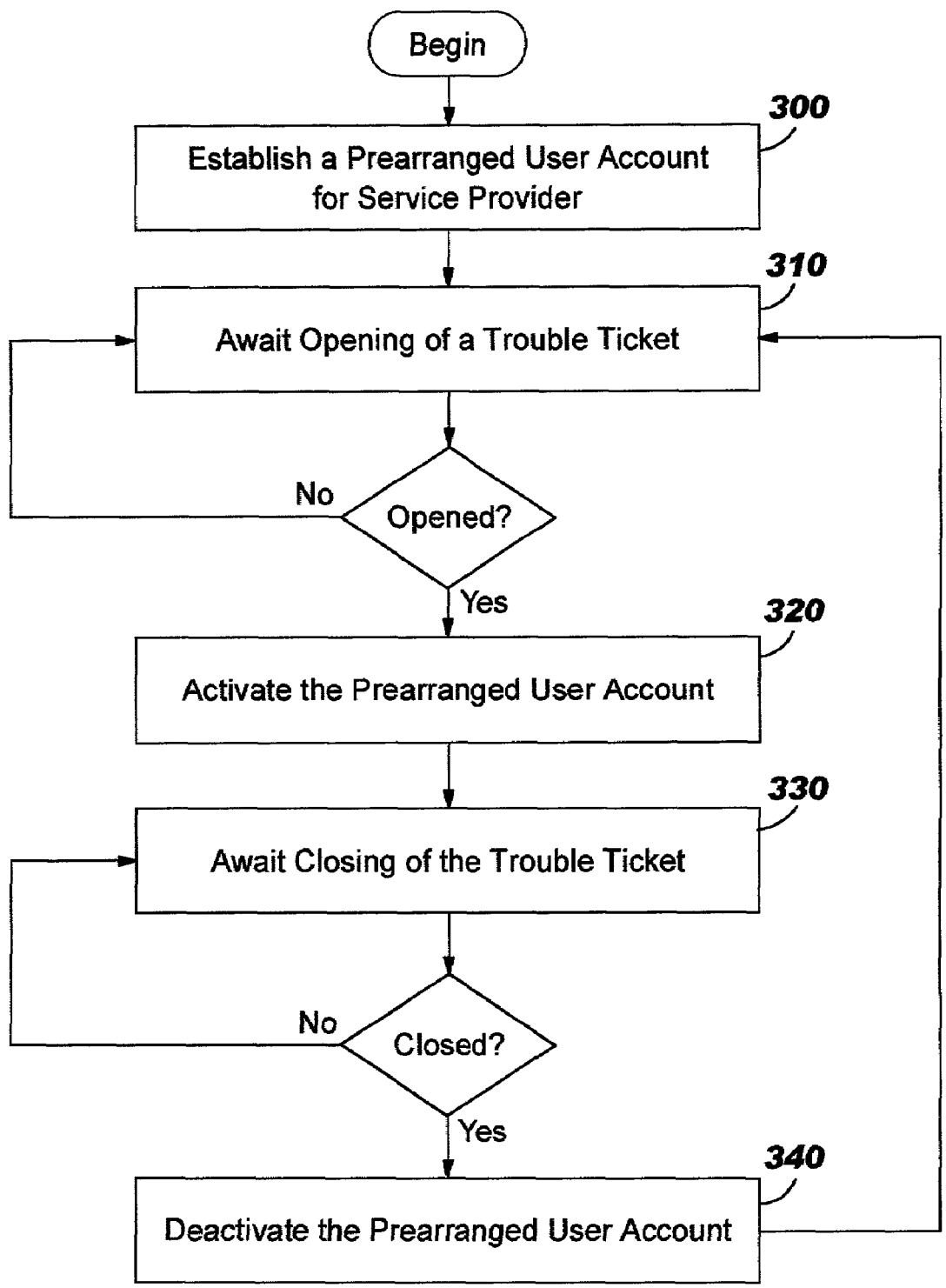

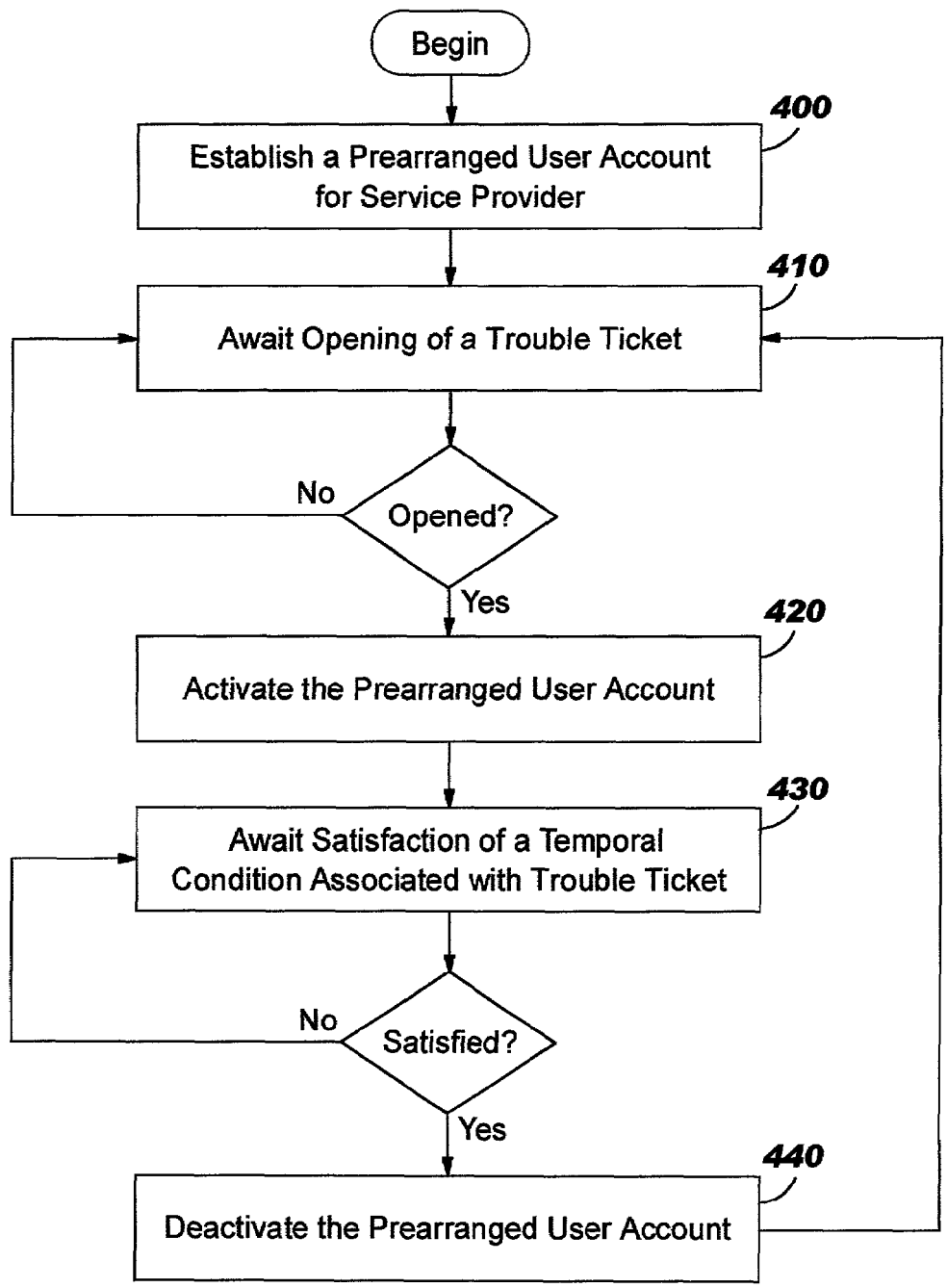

METHOD FOR AUTOMATICALLY PROVIDING A TEMPORARY USER ACCOUNT FOR SERVICING SYSTEM RESOURCES

FIELD OF THE INVENTION

The present invention relates to the field of servicing system resources such as data processing and communication equipment, and more specifically to a method for automatically providing temporary access to system resources for purposes such as satisfying service requests from a trouble ticket system.

BACKGROUND

As the business world has become relentlessly more competitive and as system resources such as data processing and communication equipment have become increasingly complex, it has become advantageous for a business enterprise to engage a specialized service provider to maintain, repair, and manage system resources. Engaging a specialized service provider frees a business to focus on its core activities rather than on its system resources. Moreover, a specialized service provider may achieve expertise and economies of scale in its niche that are unavailable to its customers, whose business interests lie elsewhere.

In some situations, a service provider may have a central facility that remotely services a number of customers. In other situations, the service provider may share facilities with the customer. In either case, the service provider must have a user account that enables the service provider to gain access to the customer's system resources in order to diagnose and repair problems.

Today, such accounts are maintained in two ways: either the service provider has a user account that stands open full time, or the customer manually opens and closes an account whenever the service provider needs access to system resources.

Unfortunately, both of these ways of maintaining accounts have significant disadvantages. In the first situation, having an open standing account exposes the customer to breaches of security by vandals who enter through the open account. In the second situation, waiting for the ad hoc opening of an account when service is needed delays the resolution of the customer's problems, and may lead to unwanted loss of business or degradation of operational efficiency.

Thus there is a need for an improved way of providing an account that enables a service provider to access a customer's system resources in a timely and responsive way so that problems may be resolved as quickly as possible, and yet does not subject the customer to the security risks associated with having a standing open account.

SUMMARY

The present invention offers an improved way of providing an account that enables a service provider to access a customer's system resources. In an embodiment of the invention, temporary access for servicing a system resource such as data processing or communication equipment is provided by activating a prearranged but otherwise dormant user account in automatic response to the occurrence of a trigger event associated with the system resource. A trigger event may be, for example, the opening of a trouble ticket by a trouble ticket system. In another embodiment of the invention, the prearranged user account is deactivated (returned to dormancy) automatically upon occurrence of a closure event associated with the trigger event. A closure event may be, for example, the closing of a trouble ticket or downgrading the severity classification of a problem tracked by a trouble ticket, the expiration of a predetermined time interval following detection of the trigger event, the occurrence of a predetermined time of day such as every midnight, and so forth.

Thus the invention provides a timely yet secure way for a customer to allow a service provider temporary access to system resources that requires neither a standing open account nor manual ad hoc opening and closing of a user account for the service provider. These and other aspects of the invention will be more fully appreciated when considered in the light of the following detailed description and drawings.

BRIEF DESCRIPTION OF THE DRAWINGS

FIG. 2 is a flowchart that shows aspects of a method for providing temporary access for servicing a system resource according to a first embodiment of the invention.

FIG. 3. is a flowchart that shows other aspects of the inventive method in a second embodiment.

FIG. 4. is a flowchart that shows yet other aspects of the inventive method in a third embodiment.

DETAILED DESCRIPTION

Figure 1:
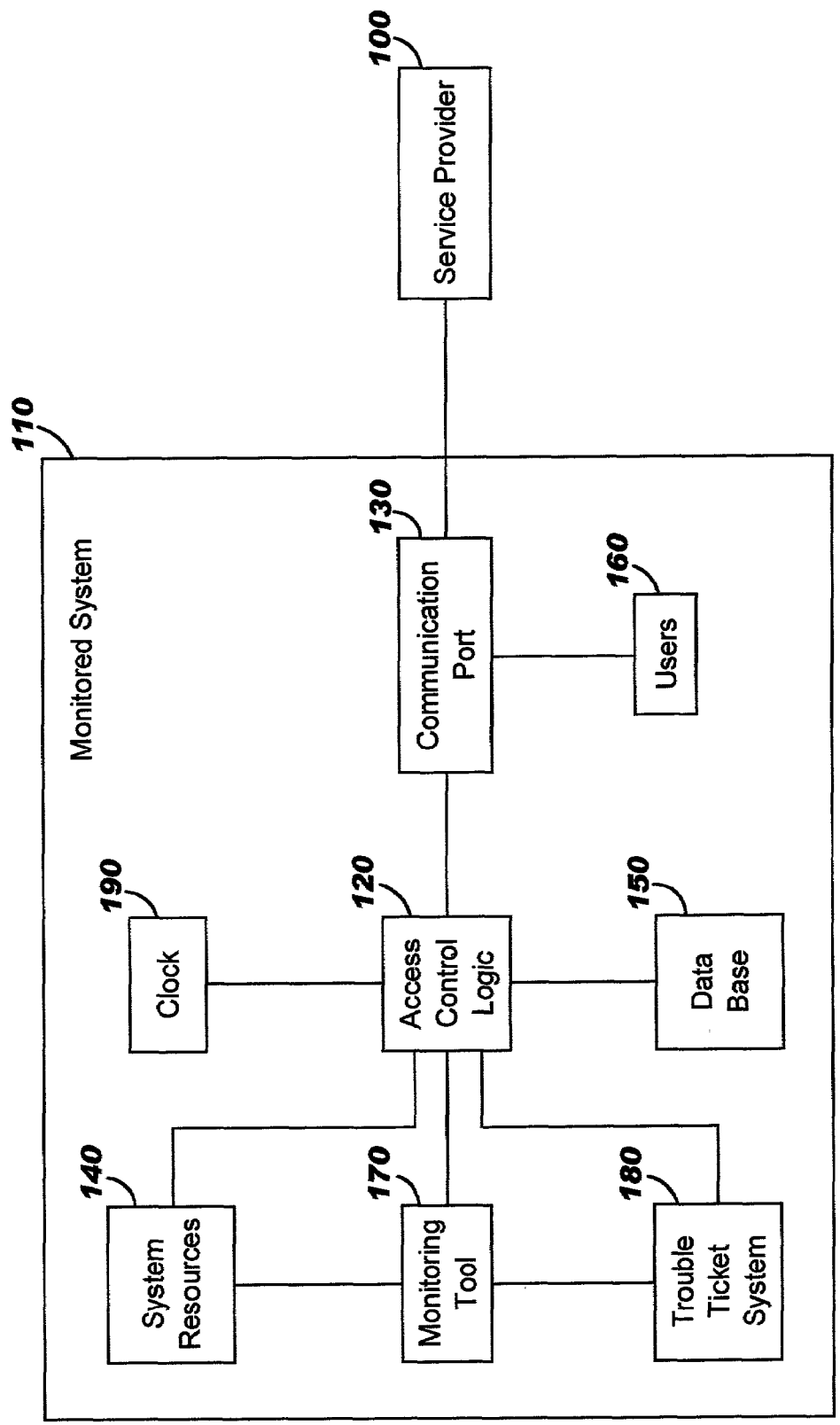
FIG. 1 is a block diagram that shows an exemplary structure suitable for application of the present invention.

The invention provides a timely yet secure way for allowing a service provider to have the temporary access needed for servicing a customer's system resources, but does not require that a user account be left standing open or that a user account be manually opened and closed by the customer on behalf of the service provider.

FIG. 1 is a block diagram that shows an exemplary structure suitable for application of the present invention. A service provider 100 provides services to a customer's monitored system 110. For example, the services provided by the service provider 100 may include one or more of the following: repair of the monitored system 110, maintenance, performance tracking, security management, change management, and so forth. In order to provide these services, the service provider 100 needs a user account with the monitored system 110 that enables the service provider 100 to access elements of the monitored system 110.

The monitored system 110 includes access control logic 120, which the service provider communicates with through a communication port 130. A purpose of the access control logic 120 is to authenticate users, including the service provider 100, who attempt to log-in to or otherwise engage system resources 140 of the monitored system 110.

The control logic may accomplish authentication by reference to user account records maintained on an associated database 150. These records may concern privileges of the service provider 100 as well as privileges of other users 160 of the monitored system 110. User accounts are set up according to criteria established by the customer, and the access control logic 120 allows or denies access to the system resources 140 based on satisfaction of these criteria.

Within the scope of the invention, the system resources 140 may include data processing equipment such as large, midrange, and personal computers; Internet web servers; communication equipment such as private branch exchanges, telephone switches, multiplexers, and so forth; as well as other devices such as computer-controlled industrial machinery or other equipment that can be serviced remotely by a service provider such as the service provider 100 of FIG. 1. However, for the purpose of clarity but not limitation, the invention is described here generally using terms suitable for embodiments wherein the system resources 140 include an Internet web server.

As shown in FIG. 1, a monitoring tool 170 monitors the system resources 140 for problems that need the attention of the service provider 100, such as malfunction, overload, degraded performance, exhausted capacity, and so forth. For example, the monitoring tool 170 may be a health checking system for an Internet web server. Although the monitoring tool 170 is shown in FIG. 1 as separate from the system resources 140, the two may be combined, the monitoring tool 170 may be combined with other elements of the monitored system 110, and so forth.

The monitoring tool 170 is functionally connected to a trouble ticket system 180, so that the monitoring tool 170 may automatically open trouble tickets on the trouble ticket system 180 when the monitoring tool 170 detects problems with the system resources 140 that need the attention of the service provider 100. The trouble ticket system 180 may have a connection to the service provider 100, for example through the access control logic 120 and the communication port 130 as shown in FIG. 1, so that the trouble ticket system 180 may pass trouble tickets to the service provider 100.

Trouble ticket systems, which may also be called incident reporting systems, issue tracking systems, and so forth, are well known to those skilled in the art. Many trouble ticket systems characterize the severity of a problem so that a service provider such as the service provider 100 has a sense of the urgency of resolving the problem. For example, a trouble ticket may characterize the severity of a problem as low, medium, or high. The severity classification may be reduced during the course of problem resolution, for example from high to medium in response to installation of a short-term patch, or in response to reconfiguration of system resources to skirt the problem. When the problem is resolved satisfactorily, the trouble ticket is closed.

Although FIG. 1 shows the trouble ticket system 180 as internal to the monitored system 110, the trouble ticket system 180 may be outside the monitored system 110, for example co-located with the service provider 100. In some situations, the trouble-ticket system 180 may communicate with the service provider 100 by e-mail, or through the World Wide Web, for example in the case of a Java-based trouble ticket system. A purpose of such communication is to transfer information relevant to the problem experienced by the system resources 140 to the service provider 100.

As shown in FIG. 1, the monitored system 110 may include a clock 190 for time-stamping records in the database 150, providing time of day to the access control logic 120, counting-down predetermined intervals of time, and so forth.

FIG. 2 is a flowchart that shows aspects of the inventive method. The customer who is responsible for the monitored system 110 establishes—i.e., prearranges—a user account for the service provider 100 (step 200), for example by recording the provisions of such an account on the database 150. When activated, the prearranged user account enables the service provider 100 to log-in to and access the system resources 140, i.e., when the prearranged user account is activated, the access control logic 120 allows the service provider 100 to gain access to the system resources 140 through the prearranged user account. Until the prearranged user account is activated, however, the prearranged user account is dormant, which means here that the access control logic 120 blocks attempts to use the prearranged user account.

The prearranged user account may be activated by the trouble ticket system 180, by the monitoring tool 170, or by other logic such as logic within the monitored system 110. The prearranged user account may be deactivated, i.e., returned to dormancy, by the trouble ticket system 180, by the monitoring tool 170, by the access control logic 120, or by other logic such as logic within the monitored system 110.

The method of FIG. 2 then awaits the occurrence of a trigger event (step 210) associated with the system resources 140. A trigger event may be, for example, detection of a problem by the monitoring tool 170, opening of a trouble ticket on the trouble ticket system 180, and so forth. In automatic response to the occurrence of a trigger event, the prearranged user account is activated (step 220).

The method then awaits the occurrence of a closure event associated with the trigger event (step 230). A closure event may be the occurrence of a service condition, for example the closing of a previously opened trouble ticket, or the reduction in severity of a problem tracked by the trouble ticket. A closure event may also, or alternatively, be the satisfaction of a temporal condition, for example the expiration of a predetermined period of time after the occurrence of the trigger event (e.g., two hours after the opening of a trouble ticket), or at a predetermined time of day (e.g., at each midnight). In automatic response to the occurrence of the closure event, the prearranged user account is deactivated (step 240), and the method returns to await the occurrence of another trigger event (step 210).

FIG. 3 is a flowchart that shows aspects of another embodiment of the inventive method. The customer who is responsible for the monitored system 110 establishes a prearranged user account for the service provider 100 (step 300). When activated, the prearranged user account enables the service provider 100 to log-in to and access the system resources 140, i.e., when the prearranged user account is activated, the access control logic 120 allows the service provider 100 to gain access to the system resources 140 through the prearranged user account. Until the prearranged user account is activated, however, the prearranged user account is dormant. The prearranged user account may be activated by the trouble ticket system 180, by the monitoring tool 170, or by other logic such as logic within the monitored system 110. The prearranged user account may be deactivated, i.e., returned to dormancy, by the trouble ticket system 180, by the monitoring tool 170, by the access control logic 120, or by other logic such as logic within the monitored system 110.

The method of FIG. 3 then awaits the opening of a trouble ticket associated with the system resources 140 (step 310). In automatic response to the opening of the trouble ticket, the prearranged user account is activated (step 320). Once the prearranged user account has been activated, the method then awaits the closing of the trouble ticket (step 330). In automatic response to the closing of the trouble ticket, the prearranged user account is deactivated (step 340), and the method returns to await the opening of another trouble ticket (step 310).

FIG. 4 is a flowchart that shows aspects of yet another embodiment of the inventive method. The customer who is responsible for the monitored system 110 establishes a prearranged user account for the service provider 100 (step 400). When activated, the prearranged user account enables the service provider 100 to log-in to and access the system resources 140, i.e., when the prearranged user account is activated, the access control logic 120 allows the service provider 100 to gain access to the system resources 140 through the prearranged user account. Until the prearranged user account is activated, however, the prearranged user account is dormant. The prearranged user account may be activated by the trouble ticket system 180, by the monitoring tool 170, or by other logic such as logic within the monitored system 110. The prearranged user account may be deactivated, i.e., returned to dormancy, by the trouble ticket system 180, by the monitoring tool 170, by the access control logic 120, or by other logic such as logic within the monitored system 110.

The method of FIG. 4 then awaits the opening of a trouble ticket associated with the system resources 140 (step 410). In automatic response to the opening of the trouble ticket, the prearranged user account is activated (step 420). Once the prearranged user account has been activated, the method then awaits satisfaction of a temporal condition associated with the trouble ticket (step 430). Such a temporal condition may be, for example, the expiration of a predetermined period of time after the opening of the trouble ticket (e.g., two hours after the opening of the trouble ticket), or at a predetermined time of day (e.g., at each midnight). In automatic response to satisfaction of the temporal condition, the prearranged user account is deactivated (step 440), and the method returns to await the opening of another trouble ticket (step 410).

From the foregoing description, those skilled in the art will appreciate that the present invention enables a service provider to have temporary access a to customer's system resources in a timely and responsive way so that problems may be resolved as quickly as possible, and yet does not subject the customer to the security risks associated with having a standing open account. For descriptive convenience, invention has been put in the context of a customer and a service provider. Nevertheless, the invention is not limited to a narrow meaning of the terms "customer" and "service provider," and applies as well where access to a monitored system is required only temporarily to satisfy a service request. The invention applies as well, for example, in situations where the customer and the service provider are part of the same company, with the service provider being the owner of a particular application who may require temporary system access or additional system privileges to address a problem with the application. Thus, and in general, the foregoing description is illustrative rather than limiting, and the invention is limited only by the following claims.

We claim:

1. A method for automatically providing temporary access for servicing a system resource, comprising the steps of:

establishing a user account for a service provider according to criteria established by a user who is a customer of the service provider, wherein said establishing is performed by the user, wherein a user system of the user comprises the system resource, wherein the service provider is external to the user system and is coupled to a communication port of the user system, wherein the user account comprises provisions, wherein said establishing the user account comprises recording the provisions of the user account on a database comprised by the user system, wherein subsequent activation of the established user account after said establishing enables a service provider to use access control logic of the user system to access the system resource through the user account, and wherein the access control logic attempts to block access to the user account when the user account is not activated;

after said establishing and while the established user account is not activated, monitoring the system resource by a monitoring tool of the user system for an occurrence of a trigger event associated with the system resource, wherein the trigger event comprises an opening of a trouble ticket by a trouble ticket system of the user system, wherein the trouble ticket denotes that the system resource has a problem that needs attention of the service provider and comprises information relevant to the problem;

in automatic response to the occurrence of the trigger event as determined from said monitoring while the established user account is not activated, passing the trouble ticket from the user system to the service provider and activating the user account to authenticate the service provider to access the system resource to enable the service provider to provide one or more services relating to the system resource, wherein said activating the user account is performed by the trouble ticket system or the monitoring tool;

following said activating and while the user account remains activated, awaiting an occurrence of a closure event associated with the trigger event; and in automatic response to the occurrence of the closure event, deactivating the user account to dormancy such that use of the user account is blocked, wherein said deactivating is performed by the trouble ticket system, the monitoring tool, or the access control logic.

2. The method of claim 1, wherein the closure event includes satisfaction of a temporal condition.

3. The method of claim 2, wherein the temporal condition includes arrival of a predetermined time.

4. The method of claim 1, wherein the closure event includes a closure of the trouble ticket in response to the problem being resolved.

5. The method of claim 1, wherein said passing the trouble ticket from the user system to the service provider is implemented by e-mail or through the World Wide Web.

6. The method of claim 1, wherein the trouble ticket characterizes a severity of the problem as low, medium, or high.

7. The method of claim 6, wherein the closure event includes a reduction of the severity of the problem characterized by the trouble ticket.

8. The method of claim 7, wherein the reduction of the severity of the problem includes an installation of a short-term patch.

9. The method of claim 1, wherein the one or more services are selected from the group consisting of repair of the system resource, maintenance of the system resource, performance tracking of the system resource, security management of the system resource, change management of the system resource, and combinations thereof.

10. The method of claim 1, wherein the problem is selected from the group consisting of a malfunction of the system resource, an overload of the system resource, a degraded performance of the system resource, and an exhausted capacity of the system resource.

11. The method of claim 1, wherein the system resource comprises computer-controlled industrial machinery.

12. The method of claim 1, wherein said activating the user account is performed by the trouble ticket system.

13. The method of claim 1, wherein said activating the user account is performed by the monitoring tool.

14. The method of claim 1, wherein the closure event includes expiration of a predetermined interval of time.

15. A method for automatically providing temporary access for servicing a system resource, comprising the steps of;

establishing a prearranged user account, wherein subsequent activation of the established user account enables a service provider to use access control logic to access a system resource through the user account, and wherein the access control logic attempts to block access to the user account when the user account is not activated;

after said establishing and while the established user account is not activated, awaiting an occurrence of a trigger event associated with the system resource, wherein the trigger event comprises an opening of a trouble ticket and denotes that the system resource has a problem that needs attention of the service provider;

in automatic response to the occurrence of the trigger event while the established user account is not activated, activating the user account to authenticate the service provider to access the system resource to enable the service provider to provide one or more services relating to the system resource;

following said activating and while the user account remains activated, awaiting an occurrence of a closure event associated with the trigger event; and in automatic response to the occurrence of the closure event, deactivating the prearranged user account to dormancy such that use of the prearranged user account is blocked, wherein the closure event includes satisfaction of a temporal condition, and wherein the temporal condition includes expiration of a predetermined interval of time.

\* \* \* \* \*